Aug. 2, 1960 — W. N. OLSON — 2,947,372
MULTI-ROW PLANTER
Filed March 26, 1958 — 4 Sheets-Sheet 1
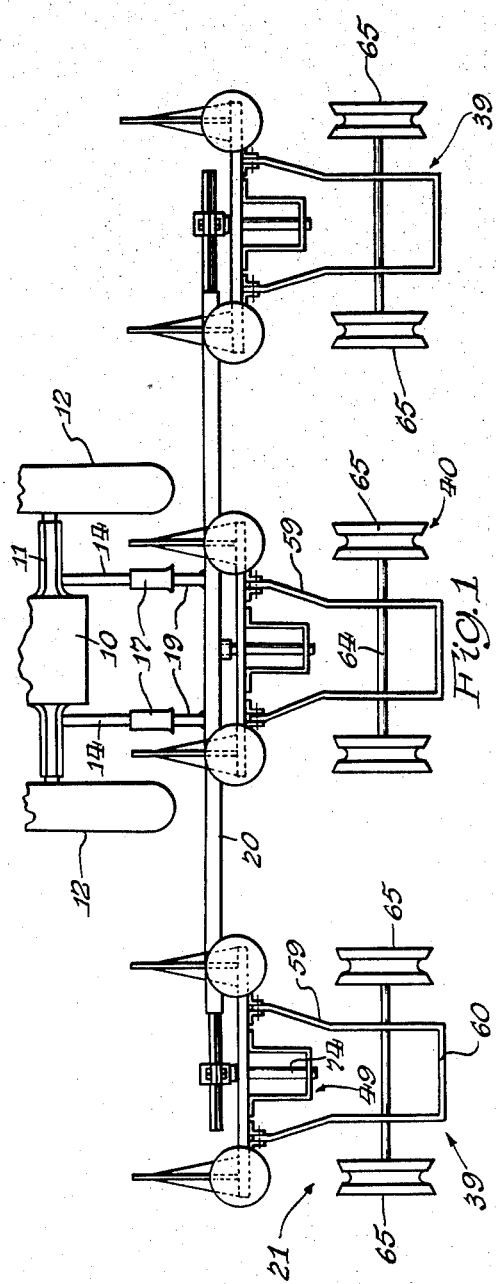
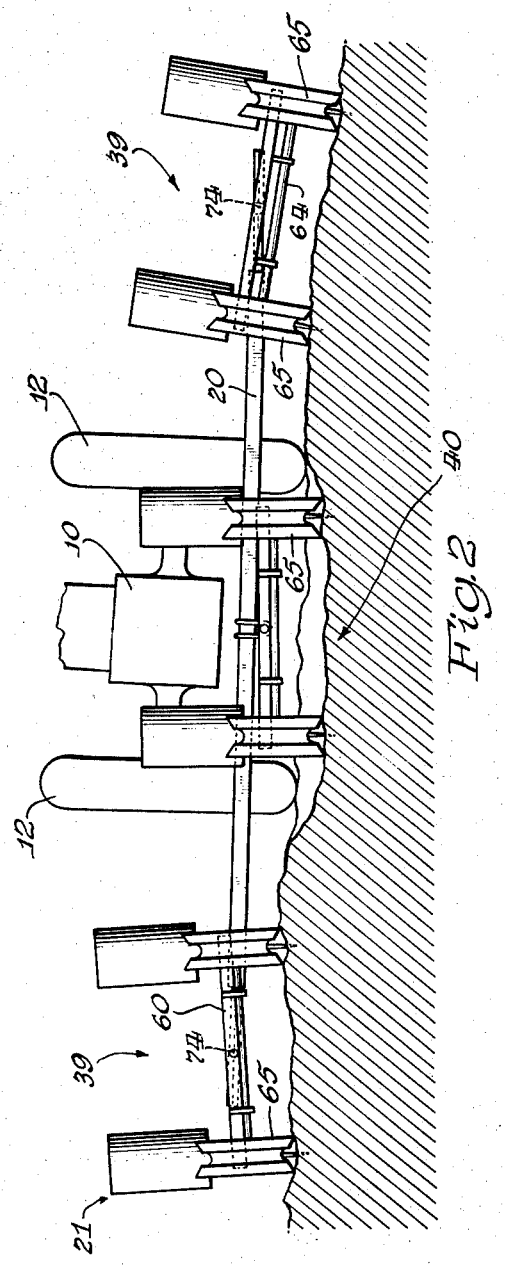
Inventor
William N. Olson
Paul O. Pippel
Attorney

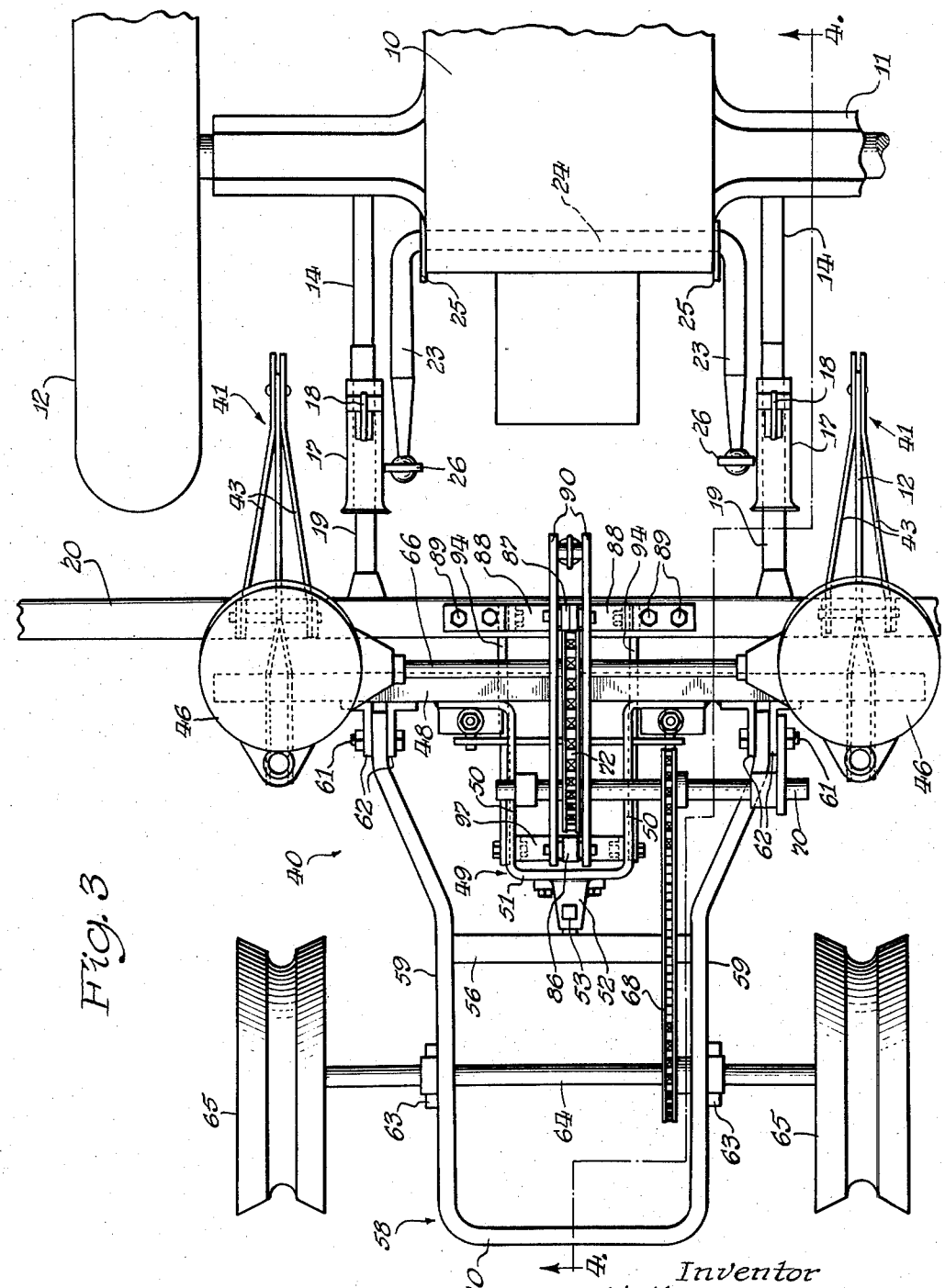

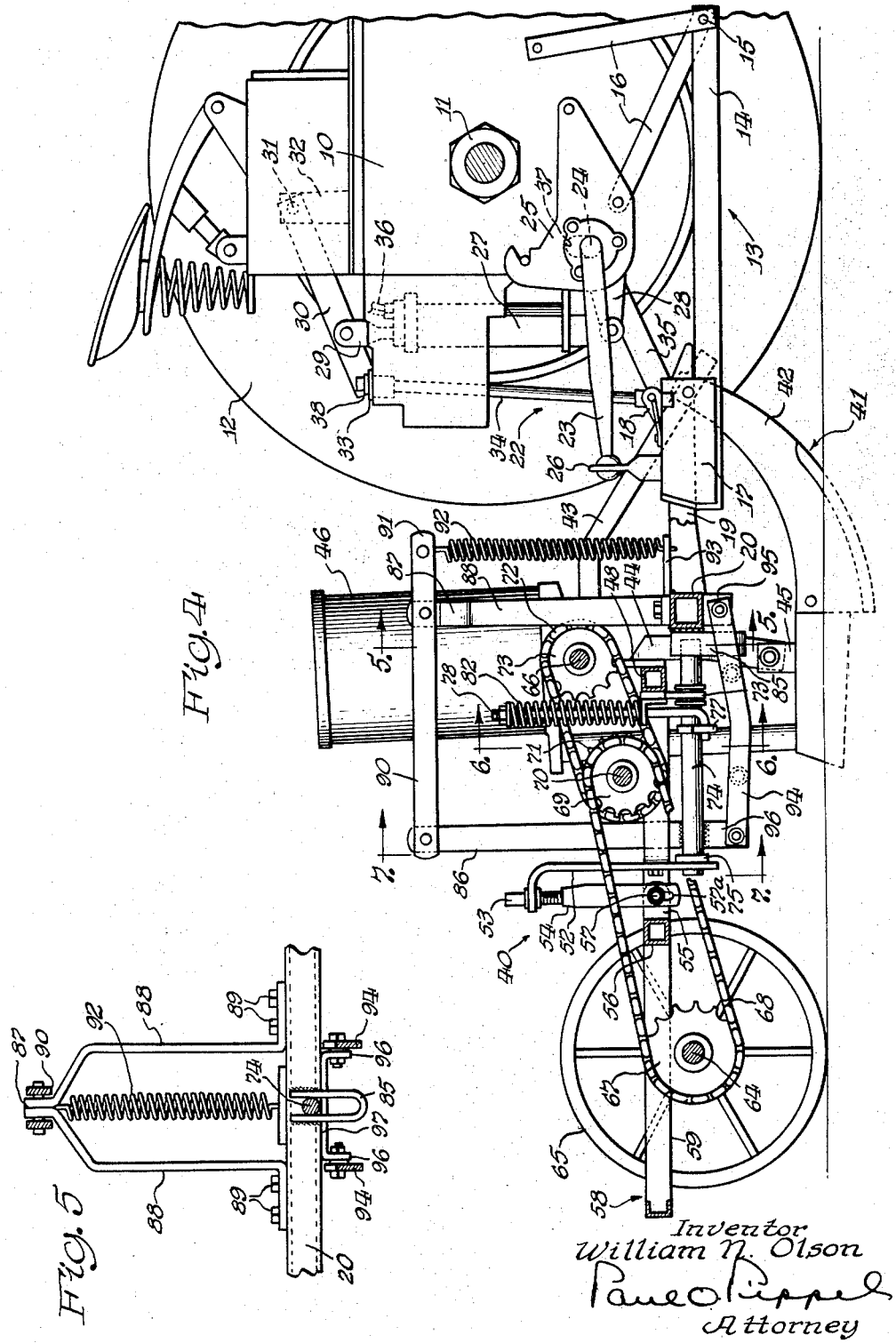

Aug. 2, 1960 W. N. OLSON 2,947,372
MULTI-ROW PLANTER
Filed March 26, 1958 4 Sheets-Sheet 4
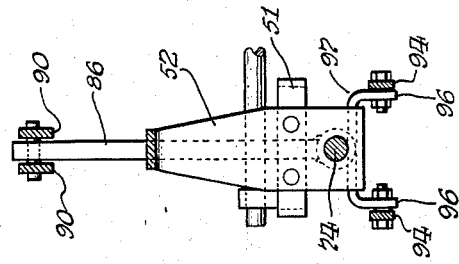
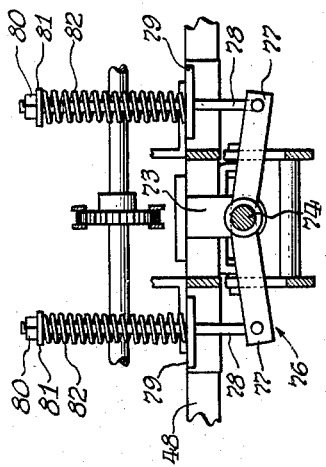
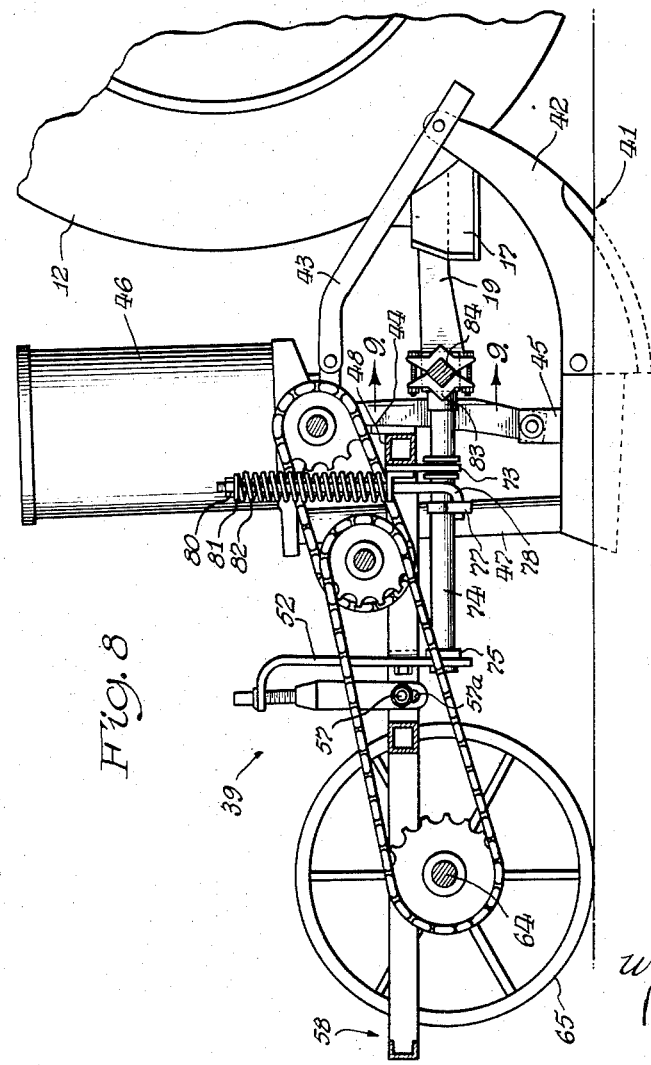
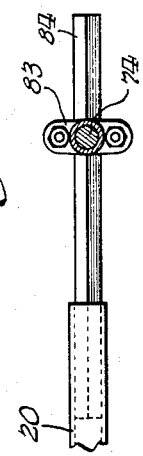
Inventor
William N. Olson
Paul O. Pippel
Attorney

United States Patent Office 2,947,372
Patented Aug. 2, 1960

2,947,372

MULTI-ROW PLANTER

William N. Olson, Canton, Ill., assignor to International Harvester Company, Chicago, Ill., a corporation of New Jersey Filed Mar. 26, 1958, Ser. No. 724,120

7 Claims. (Cl. 172—624)

This invention relates to agricultural implements and particularly to multi-row planters. More specifically, the invention concerns a tool bar type of planter wherein a plurality of earth working units are mounted on a supporting frame in laterally spaced relation.

The present invention has for its object the provision of a planter comprising three or more laterally spaced earth-working units adapted to travel upon prepared seed beds.

Another object of the invention is the provision of a multi-row planter consisting of laterally spaced units mounted on a rigid frame and adapted to accommodate themselves to irregularities in the ground independently of the supporting frame.

Another object of the invention is the provision, in an implement including laterally spaced furrow opener units adapted to travel in adjacent rows, of means accommodating flexibility of the furrow opener units about longitudinal and transverse axes to compensate for differences in the level of the ground over which the implement passes.

A further object of the invention is the provision, in a planter wherein three laterally spaced pairs of furrows opener units are mounted on a transverse frame, of means in the mounting of said pairs of units accommodating tilting thereof about a longitudinal axis between the units of each pair, and additional means in the mounting of the central pair of units accommodating vertical movement thereof relative to the supporting frame.

Other objects and advantages of the invention will become clear from the following detailed description when read in conjunction with the accompanying drawings, wherein:

Fig. 1 is a diagrammatic plan view of a six-row planter embodying the features of this invention mounted upon the rear end of a tractor;

Fig. 2 is a rear elevation of the structure shown diagrammatically in Fig. 1;

Fig. 3 is a plan view on an enlarged scale of the center units of a six-row planter mounted upon the rear end of a tractor with parts removed for clarity;

Fig. 4 is a section taken on the line 4—4 of Fig. 3;

Fig. 5 is a section taken on the line 5—5 of Fig. 4;

Fig. 6 is a section taken on the line 6—6 of Fig. 4;

Fig. 7 is a section taken on the line 7—7 of Fig. 4;

Fig. 8 is a sectional view on an enlarged scale and in side elevation of one of the end units shown in Figs. 1 and 2; and Fig. 9 is a detail showing one of the end extensions of the tool bar support for the planter of this invention.

In the drawings, the numeral 10 designates the body of a tractor having a transverse rear axle structure 11 and laterally spaced drive wheels 12. A draft frame 13 extends longitudinally of the tractor below the body thereof and comprises laterally spaced forwardly converging bars 14 pivotally connected at 15 for vertical swinging to hitch straps 16 secured to the tractor body. The details of construction of the draft frame 13 form no part of this invention. However, it should be noted that to the rear end of each bar 14 is affixed an elongated socket member 17 having locking means 18 thereon and adapted to slidably receive and lock therein a pair of laterally spaced shafts 19, the rear ends of which are affixed to an elongated transversely extending tool bar 20, square in cross-section, forming a part of the implement of this invention designated at 21.

Lift means designated at 22 in Figure 4 is provided on the tractor and includes a pair of laterally spaced lift arms 23 integral with and extending rearwardly from a rockshaft 24 carried by a pair of brackets 25 secured to the tractor body at opposite sides thereof. The rear end of each lift arm 23 is pivotally connected to the upper end of a lifting link 26, the lower end of which is pivotally connected to the associated socket member 17.

Rocking of shaft 24 to swing lift arms 23 for raising and lowering the draft frame 13 and the implement 21 connected thereto is accomplished by means indicated in Fig. 4 which comprises a hydraulic ram 27 pivotally connected at its lower end to an arm 28 affixed to one of the plates 25. Ram 27 has a piston rod 29 which is pivotally connected to a link 30 connected at one end to a pivot pin 31 carried by a lug 32 affixed to the tractor body. The rear end of link 30 carries a swivel 33 which is suitably apertured to slidably receive a rod 34, the lower end of which is connected to an arm 35 affixed to the rockshaft 24. The ram 27 receives fluid under pressure through hose lines 36 from a source of fluid under pressure, not shown, deriving power from the tractor. It should also be noted that one of the brackets 25 is provided with a slot 37 so that one end of rockshaft 24 is capable of free vertical floating to permit tilting of the draft frame 13 about a longitudinal axis for reasons that that will herinafter become clear. Further details of construction of the rockshaft 24 and its support may be had by reference to U.S. Patent No. 2,776,613. Rod 34 is slidable in swivel 33 to accommodate vertical movement of the draft frame 13 about the hitch point 15, a cap 38 being provided on the rod and engageable with the swivel 33 so that extension of piston rod 29 in ram 27 swings link 30 upwardly and raises the implement to a transport position.

Implement 21 is a six-row planter comprising two outer two-row units 39 and a central two-row unit 40. The outer units 39 are substantial duplicates. Furthermore, most of the parts of the central unit 40 are the same as corresponding parts in the outer units 39. Therefore, where the parts are the same, like numerals will refer to like parts on all of the units. Also, for details of construction of the outer units 39, reference may be had to copending U.S. application Serial No. 456,704 filed September 17, 1954, now Patent No. 2,871,964.

Each unit 39 and 40 comprises a pair of laterally spaced furrow forming devices 41, each of which includes an earth-penetrating furrow-forming tool 42, the forward end of which is connected to a pair of straps 43 which are connected to a bracket 44 at its upper end. The rear portion of the tool 42 has a lug 45 which is connected to the lower end of bracket 44.

Also mounted upon each of the brackets 44 is a hopper 46 for seed or the like to which is connected a tube 47 by which seed is directed to the rear end of the furrow opener 42.

Brackets 44 are fixed to a transversely extending forward frame bar 48, square in cross section, forming a part of the supporting frame. Also forming a part of the supporting frame for each unit is a rearwardly extending U-shaped brace 49, the laterally spaced arms 50 of which are bent at right angles at their forward ends and affixed, as by welding, to the bar 48.

The rear end of brace 49 has a transverse portion 51 to which is affixed a vertically extending bracket 52 bent at right angles and having mounted therein the upper end of a bolt 53, the lower end of which is threaded for reception in a sleeve 54, the lower end of which is bifurcated to straddle a lug 55 affixed to and projecting forwardly from a square bar 56. The lower end of sleeve 54 is pivotally connected to the lug 55 by a bolt 57 slidable in slots 57a formed in the lower end of the sleeve.

Bar 56 is part of a wheel supported subframe 58, the ends of the bar 56 being secured to the side bars 59 of the frame 58. The bars 59 are connected at their rear ends by the transverse portion 60. The forward ends of bars 59 diverge and are pivotally connected by bolts 61 to spaced pairs of angle brackets 62 secured to the bar 48. Also secured to the side bars 59 of subframe 58 are bearing members 63 in which is rotatably mounted a shaft 64 upon the ends of which are mounted ground-engaging gauge and press wheels 65. At this point it should be clear that the wheeled frame 58 is capable of limited vertical movement relative to brace 49 and bar 48 by virtue of the bolt and slot connection 57, 57a. Likewise, minor adjustments can be made in the vertical position of the frame 58 and wheel 65 by adjusting the position of threaded bolt 53 in sleeve 54.

Ground wheels 65 also act as drive wheels for the feed shaft 66 which operates, in a manner not shown, to drive conventional seed dispensing means in the hoppers 46. Drive is transmitted from a sprocket wheel 67 and a drive chain 68 to another sprocket wheel 69 mounted on a cross shaft 70 which has mounted thereon another sprocket 71 connected by a chain 72 mounted on shaft 66.

The six-row planter of this invention is particularly adapted for use on previously prepared beds, such as are prepared by middlebusters and the like. Many times the adjacent beds formed by the middlebuster, and upon which the furrow-forming units 41 of the planting units 39 or 40 travel, are irregular in height at the time of planting and unless this irregularity is compensated for, difficulties are interposed to planter operation and non-uniform planting occurs, creating, among other things, problems in early cultivation and the like. With the planter of this invention, these irregular seed beds are automatically equalized and all of the planting units operate uniformly.

Affixed to each of the bars 48 and depending therefrom is a plate 73, which projects below the bar 48 and is apertured to receive for pivoting with respect thereto, a longitudinally extending tubular supporting member 74 in the case of the central planter unit 40 shown in Figs. 4 and 5.

The rear end of supporting member 74 is seated in a socket 75 carried at the lower end of bracket 52, and welded to the central portion thereof is an equalizing means 76 comprising laterally extending arms 77, the ends of which are provided with openings to receive the bent lower ends of a pair of laterally spaced rods 78, which are slidably receivable in openings provided in angle brackets 79 affixed to the bar 48. The upper end of each of the rods 78 is threaded to receive a nut 80 and a washer 81 engageable with the upper end of a spring 82 which surrounds the rod and rests upon the upper surface of the bracket 79.

In the case of the outer planter units 39, shown in side elevation in Fig. 8, the tubular supporting member 74 has its forward end rigidly affixed to a clamp 83 secured to a square extension 84 affixed to each end of tool bar 20. Frame bar 48 for each of the outer planter units 39 thus maintains a constant vertical position relative to the tool bar 20 but is capable of tilting with its mounted planter units laterally about the axis of the tubular supporting member 74. This tendency of the planter unit to tilt about the central longitudinal axis is in response to irregularities in the ground over which the planter travels. This tilting tendency is yieldably opposed by the springs 82 which tend to force the implement to remain in a level position. This assures uniform planting in adjacent seed beds.

Where a four-row planter is concerned two laterally spaced units 39 are adequate and follow the contour of the ground for uniform planting, tilting about their longitudinal pivotal supports independently to equalize the height of adjacent seed beds. The tilting of the hitch or draft structure 13 about its longitudinal axis, and therefore the tilting therewith of the tool bar 20, is satisfactorily accommodated. However, in the six-row planter with which this invention is concerned wherein an additional two-row unit 40 is centrally mounted on the tool bar 20 between the outer units 39, a situation such as is illustrated in Fig. 2 occurs wherein a depression is encountered between the outer units. In such a case, were all of the planter units like the outer units 39, that is, with the central pivot member 74 affixed to the tool bar 20, the earth-working or furrow-forming elements of the central unit would be lifted clear of the ground. Likewise, where the ground under one of the outer units 39 is lower than the other, a vertically rigid center unit would act as a fulcrum supporting the tool bar with one of the outer units lifted clear of the ground. The present invention overcomes these difficulties and makes it possible to plant uniformly with a wide-spread and multi-row planter. This is made possible by imparting an additional vertical flexibility to the central planter unit so that it can rise or fall as needed to keep the three planting units operating uniformly.

The structure of the pivot member 74 for central planter unit 40 is substantially the same as for the outer units 39, as well as the means of suspension from the hanger 73 and the equalizing arm and spring arrangement 77, 82. However, the forward end of the pivot member 74 for the central unit 40 is vertically movable relative to tool bar 20. The forward end of the pivot member 74 for central unit 40 is slidably received and confined between the arms of a U-shaped guide 85 secured, as by welding, to the tool bar 20 and is thus capable of vertical translational movement with respect to the tool bar. The means by which the central planter unit 40 is connected to tool bar 20 for vertical floating movement relative thereto includes a standard 86 welded at its lower end to the rear portion of member 74 and another upright member or standard 87 having laterally spaced legs 88 secured to the tool bar 20 by bolts 89. An upper link 90 is pivotally connected to the upper ends of standards 86 and 87 and has a forward projection 91 serving as an anchor for the upper end of a spring 92, the lower end of which is connected to a plate 93 affixed to the tool bar 20. Upper link 90 includes laterally spaced members generally parallel to a pair of laterally spaced lower links 94, the forward ends of which are pivotally connected to lugs 95 secured to and depending from tool bar 20, and the rear ends of which are pivotally connected to the depending legs 96 of a U-shaped member 97 secured, as by welding, to pivot member 74 and forming an extension of standard 86. Spring 92 functions as a balance spring tending to hold up the center planter unit 40, the parallel link suspension being effective to accommodate vertical movement of the center unit 40 relative to the tool bar and to the outer units 39, allowing it to drop, for example, below the level of the other units when a depression such as indicated in Fig. 2 is encountered. When in working position, the center unit is carried by the outside units 39.

It is believed that the operation of the novel multi-row planter of this invention will be clearly understood from the foregoing description. It should likewise be understood, however, that the invention has been described in its preferred embodiment and that modifications may be made therein without departing from the spirit of the invention or the scope of the appended claims.

What is claimed is:

1. The combination with a tractor having a vertically movable draft structure adapted for lateral tilting about a longitudinal axis, of an implement comprising a transverse tool bar carried by said draft structure for lateral tilting therewith, a longitudinally extending pivot member secured to each end of said tool bar, an earth-working unit including laterally spaced furrow openers mounted on each said pivot member for lateral tilting as a unit about the axis thereof, a central longitudinally extending pivot member, another earth-working unit including laterally spaced furrow openers mounted on said central pivot member for lateral tilting about the axis thereof, means mounting said central pivot member on said tool bar for vertical movement thereof and of said earth-working unit relative to said tool bar, including vertically spaced generally parallel links pivotally connected at one end to said tool bar and at their other ends to said central pivot member.

2. The combination with a tractor having a vertically movable draft structure adapted for lateral tilting about a longitudinal axis, of an implement comprising a transverse tool bar carried by said draft structure for lateral tilting therewith, a longitudinally extending pivot member secured to each end of said tool bar, an earth-working unit including laterally spaced furrow openers mounted on each said pivot member for lateral tilting as a unit about the axis thereof, a central longitudinally extending pivot member, another earth-working unit including laterally spaced furrow openers mounted on said central pivot member for lateral tilting about the axis thereof, means mounting said central pivot member on said tool bar for vertical movement thereof and of said earth-working unit relative to said tool bar, including an upright member affixed to said tool bar, vertically spaced parallel links pivotally connected at one end to said upright member and at their other ends to said central pivot member.

3. The combination with a tractor having a vertically movable draft structure adapted for lateral tilting about a longitudinal axis, of an implement comprising a transverse tool bar carried by said draft structure for lateral tilting therewith, a longitudinally extending pivot member secured to each end of said tool bar, an earth-working unit including laterally spaced furrow openers mounted on each said pivot member for lateral tilting as a unit about the axis thereof, a central longitudinally extending pivot member, another earth-working unit including laterally spaced furrow openers mounted on said central pivot member for lateral tilting about the axis thereof, means mounting said central pivot member on said tool bar for vertical movement thereof and of said earth-working unit relative to said tool bar including an upright member affixed to said tool bar, vertically spaced parallel links pivotally connected at one end to said upright member and at their other ends to said central pivot member, and yieldable means connecting said links to said tool bar opposing downward movement of said central unit relative thereto.

4. The combination with a tractor having a vertically movable draft structure adapted for lateral tilting about a longitudinal axis, of an implement comprising a transverse tool bar carried by said draft structure for lateral tilting therewith, an outer earth-working unit mounted on said tool bar at each end thereof and a central earth-working unit between said outer units, a longitudinally extending pivot member carried by each of said units pivotally mounted on said tool bar to accommodate lateral tilting of each said unit relative thereto, means in the mounting of the pivot member for said central unit on said tool bar accommodating translational vertical movement of said central pivot member relative to the tool bar, and vertically spaced generally parallel links connecting said central unit to said tool bar.

5. The invention set forth in claim 4, wherein means are provided in the connection of said central unit to said tool bar yieldably opposing downward movement of said central unit relative thereto.

6. In a multi-row planter wherein an elongated transverse tool bar is integrally connected to a tractor hitch structure which is freely laterally tiltable about a longitudinal axis to accommodate the planter to changes in ground contour, and wherein said tool bar supports laterally spaced outer planter units, each of which is mounted for independent lateral tilting on a longitudinal pivot member rigidly affixed to said tool bar and accommodating said lateral tilting of said outer units while preventing vertical movement thereof relative to the tool bar, the combination of a central planter unit between said outer units, a longitudinal pivot member supporting said central unit for lateral tilting thereon, and means accommodating translational vertical movement thereof for connecting said last-mentioned pivot member to said tool bar.

7. In a multi-row planter wherein an elongated transverse tool bar is integrally connected to a tractor hitch structure which is freely laterally tiltable about a longitudinal axis to accommodate the planter to changes in ground contour, and wherein said tool bar supports laterally spaced outer planter units, each of which is mounted for independent lateral tilting on a longitudinal pivot member rigidly affixed to said tool bar, the combination of a central planter unit between said outer units, a longitudinal pivot member supporting said central unit for lateral tilting thereon, a standard affixed to said pivot member, a standard affixed to said tool bar, and vertically spaced generally parallel links pivotally connected to said standards.

References Cited in the file of this patent
UNITED STATES PATENTS

| | | |
|---|---|---|
| 2,159,669 | Morkoski | May 23, 1939 |
| 2,345,741 | Foulke | Apr. 4, 1944 |
| 2,624,256 | Todd | Jan. 6, 1953 |
| 2,640,405 | Wheeler | June 2, 1953 |
| 2,656,776 | Cox et al. | Oct. 27, 1953 |
| 2,776,613 | Orelind | Jan. 8, 1957 |